(12) United States Patent
Maguire (10) Patent No.: US 11,454,174 B2
(45) Date of Patent: *Sep. 27, 2022

(54) GAS TURBINE (71) Applicant: ROLLS-ROYCE PLC, London (GB)

(72) Inventor: Alan R Maguire, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/147,762

(22) Filed: Jan. 13, 2021

(65) Prior Publication Data

US 2021/0156313 A1 May 27, 2021

Related U.S. Application Data (63) Continuation of application No. 16/451,543, filed on Jun. 25, 2019, now Pat. No. 10,920,672.

(30) Foreign Application Priority Data

Jun. 27, 2018 (GB) .................................. 1810526
Jun. 27, 2018 (GB) .................................. 1810527
Jun. 27, 2018 (GB) .................................. 1810528

(51) Int. Cl.
F02C 7/36 (2006.01)
F01D 25/16 (2006.01)
(Continued)

(52) U.S. Cl.
CPC ................ F02C 7/36 (2013.01); F01D 15/12 (2013.01); F01D 25/16 (2013.01); F01D 25/34 (2013.01);
(Continued)

(58) Field of Classification Search
CPC .......... F01D 25/16; F01D 15/12; F01D 15/34; F01D 25/162; F01D 5/02; F02K 3/06;
(Continued)

(56) References Cited

U.S. PATENT DOCUMENTS 4,916,894 A 4/1990 Adamson et al.
4,969,325 A 11/1990 Adamson et al.
(Continued)

FOREIGN PATENT DOCUMENTS

EP 1 114 949 A2 7/2001
EP 1 887 199 A2 2/2008
(Continued)

OTHER PUBLICATIONS

U.S. Appl. No. 16/451,606, filed Jun. 25, 2019 in the name of Binnington.
(Continued)

Primary Examiner — Igor Kershteyn
(74) Attorney, Agent, or Firm — Oliff PLC (57) ABSTRACT A gas turbine engine, in particular an aircraft engine, includes: a turbine connected via an input shaft device to a gearbox device having a sun gear, a planet carrier having a plurality of planet gears attached thereto, and a ring gear, the sun gear is connected to the input shaft device, the planet carrier or the ring gear is connected to a propulsive fan via an output shaft device of the gearbox device, with a rear carrier bearing device radially between the planet carrier and a static structure on the input side of the gearbox device, an inter-shaft bearing system being positioned radially between the input shaft device and the planet carrier of the gearbox device.

37 Claims, 5 Drawing Sheets (51) Int. Cl.
| | |
|---|---|
| *F01D 25/34* | (2006.01) |
| *F02K 3/06* | (2006.01) |
| *F16H 1/28* | (2006.01) |
| *F16H 57/08* | (2006.01) |
| *F01D 15/12* | (2006.01) |
| *F02C 3/107* | (2006.01) |
| *F01D 5/02* | (2006.01) |
| *F02C 7/06* | (2006.01) |
| *F02K 3/04* | (2006.01) |

(52) U.S. Cl.
CPC .............. *F02K 3/06* (2013.01); *F16H 1/28* (2013.01); *F16H 57/082* (2013.01); *F01D 5/02* (2013.01); *F01D 25/162* (2013.01); *F02C 3/107* (2013.01); *F02C 7/06* (2013.01); *F02K 3/04* (2013.01); *F05D 2220/323* (2013.01); *F05D 2240/50* (2013.01); *F05D 2240/54* (2013.01); *F05D 2260/40311* (2013.01)

(58) Field of Classification Search
CPC . F02K 3/04; F16H 57/082; F16H 1/28; F02C 7/36; F02C 3/107; F02C 7/06; Y02T 50/60; F05D 2240/50; F05D 2220/32; F05D 2260/40311; F05D 2240/54
See application file for complete search history.

(56) References Cited

U.S. PATENT DOCUMENTS

| | | | |
|---|---|---|---|
| 6,622,473 | B2 | 9/2003 | Becquerelle et al. |
| 8,484,942 | B1 | 7/2013 | McCune et al. |
| 8,667,777 | B2 | 3/2014 | Gallet |
| 11,131,209 | B2 * | 9/2021 | Fontana ............... F02C 7/06 |
| 2007/0084183 | A1 | 4/2007 | Moniz et al. |
| 2011/0130246 | A1 | 6/2011 | McCune et al. |
| 2012/0099988 | A1 | 4/2012 | Charier et al. |
| 2014/0227084 | A1 | 8/2014 | Sheridan |
| 2014/0271135 | A1 | 9/2014 | Sheridan et al. |
| 2015/0217854 | A1 | 8/2015 | Duffet et al. |
| 2015/0336679 | A1 | 11/2015 | Tajan et al. |
| 2016/0010562 | A1 | 1/2016 | Sheridan |
| 2016/0097330 | A1 | 4/2016 | Venter |
| 2016/0097331 | A1 | 4/2016 | Venter et al. |
| 2016/0108808 | A1 | 4/2016 | Sheridan et al. |
| 2016/0201791 | A1 | 7/2016 | Curlier et al. |
| 2017/0074165 | A1 | 3/2017 | Schwarz et al. |
| 2017/0081973 | A1 | 3/2017 | Swift et al. |
| 2017/0082065 | A1 | 3/2017 | Swift et al. |
| 2018/0003079 | A1 | 1/2018 | Madge |
| 2018/0016939 | A1 | 1/2018 | Klaus |
| 2018/0266429 | A1 | 9/2018 | Macfarlane et al. |
| 2019/0178085 | A1 * | 6/2019 | Ripolles Perez ..... F01D 11/005 |
| 2019/0257213 | A1 * | 8/2019 | Zilli ...................... F01D 25/162 |
| 2020/0003068 | A1 * | 1/2020 | Fontana ................. F01D 25/16 |
| 2020/0003129 | A1 * | 1/2020 | Boniface ................. F02K 3/06 |

FOREIGN PATENT DOCUMENTS

| | | |
|---|---|---|
| EP | 3 001 072 A1 | 3/2016 |
| EP | 3 106 714 A2 | 12/2016 |
| EP | 3 109 412 A1 | 12/2016 |
| EP | 3 144 486 A1 | 3/2017 |
| EP | 3 267 075 A1 | 1/2018 |
| EP | 3 269 964 A1 | 1/2018 |

OTHER PUBLICATIONS

U.S. Appl. No. 16/451,677, filed Jun. 25, 2019 in the name of Maguire et al.
Dec. 9, 2018 Search Report issued in British Patent Application No. 1810527.0.
Dec. 10, 2018 Search Report issued in British Patent Application No. 1810526.2.
Dec. 10, 2018 Search Report issued in British Patent Application No. 1810528.8.
Nov. 14, 2019 Search Report issued in European Patent Application No. 19 18 2048.
Nov. 11, 2019 Extended Search Report issued in European Patent Application No. 19182049.7.
Nov. 11, 2019 Extended Search Report issued in European Patent Application No. 19182050.5.
Nov. 10, 2020 Notice of Allowance issued in U.S. Appl. No. 16/451,677.

* cited by examiner

GAS TURBINE

This application is a Continuation of Ser. No. 16/451,543, filed Jun. 25, 2019, which claims priority to GB 1810526.2, filed Jun. 27, 2018, GB 1810527.0, filed Jun. 27, 2018, and GB 1810528.8, filed Jun. 27, 2018. The entire contents of the prior applications are hereby incorporated by reference herein in their entirety.

DESCRIPTION

The disclosed embodiments relate to a gas turbine.

Gas turbine engines, in particular aircraft engines with geared turbofan engines, require a suitable support for shaft arrangements driving the gearbox and/or the propulsive fan. One shafting arrangement of a geared turbofan engine is described in EP 3 144 486 A1.

This issue is addressed by a gas turbine according to disclosed embodiments.

The gas turbine comprises a turbine connected via an input shaft device to a gearbox device having a sun gear, a planet carrier having a plurality of planet gears attached thereto, and a ring gear. Typically, the gearbox device is driven by a low pressure or intermediate pressure turbine of the gas turbine, i.e. the sun gear is connected to the input shaft device.

The gearbox device reduces the rotational speed from the turbine to the propulsive fan towards the front of the gas turbine engine making the overall engine more efficient. As will be described further below, the gearbox devices can have different designs.

Depending on the design of the gearbox device, the planet carrier or the ring gear is connected to the propulsive fan via an output shaft device of the gearbox device. The output shaft device can comprise several parts and is generally a hollow shaft with a cross-sectional shape adapted to the load case and the available space within the engine. Furthermore, there is an inter-shaft bearing system being positioned radially between the input shaft device and the planet carrier of the gearbox device.

There are two alternatives for the design of the input shaft device. In the first alternative the input shaft device has a high rigidity. This could e.g. be a 20% higher stiffness in the radial direction than the support structure (e.g. a static front cone structure, a first strut, a static structure) of the gearbox device. Alternatively and/or additionally, this could be a stiffness greater or equal to 100% of the axial stiffness.

In the second alternative the input shaft device comprises a means for decreasing the rigidity, in particular a diaphragm section.

The bearing devices may comprise more than one bearing. As will be described below, the bearing devices can be positioned axially very close to the gearbox device.

In one embodiment, the inter-shaft bearing system is located axially within or in front of a low-pressure compressor or an intermediate compressor.

In a further embodiment the rear carrier bearing device comprises at least one roller bearing and/or the inter-shaft bearing system comprises at least one ball bearing. It is e.g. also possible to use a double roller bearing with two parallel rows. Furthermore, it is possible that the bearing device comprises bearings which are set apart a certain distance. Those bearings can be identical (e.g. all roller bearings) or they can have a different design.

As mentioned above, the inter-shaft bearing system and/or the rear carrier bearing device can in one embodiment be axially adjacent to the gearbox device on the input side. The axial distance in the axial direction measured from the centreline of the gearbox device can e.g. be between 0.001 and 2 times, in particular 0.01 to 1 times the inner radius of a seat element for the bearing device. This means that the e.g. part of the bearing devices closest to the centreline of the gearbox device can be positioned on the input side of the gearbox device.

Towards the front of the engine a fan shaft bearing system is radially located between a fan shaft as part of the output shaft device and a static front cone structure, in particular the fan shaft bearing system is being axially positioned within the width of the propulsive fan. The static front cone structure—as an example for general static structure within the gas turbine—is relative at rest to the output shaft device. The loads of the fan shaft bearing system can be transmitted to the static part. In one embodiment, the fan shaft bearing system has an outer diameter between 0.05 to 0.20 times the diameter of the propulsive fan, in particular between 0.1 and 0.15 times the diameter of the propulsive fan.

In a further embodiment, the planet carrier comprising the seat element which is extending axially to the rear of the gearbox device providing a radial seat for inter-shaft bearing system.

Further to the rear of the engine an input shaft bearing system is radially located between the input shaft device and a static rear structure, the input shaft bearing system in particular comprising at least one roller bearing. As in the bearing devices or system described above, the input shaft bearing system can comprise more than one row of bearings, the rows being identical or different. The rows can be axially distanced. Alternatively, a ball bearing could be used at location of the input shaft bearing system and a roller bearing in the inter-shaft bearing system.

The shape of the output shaft device can be adapted to spatial requirements. For providing sufficiently mechanical properties, embodiments of the output shaft device can comprise at least one axial cross-section with a conical, sigmoidal or logarithmical shape. In one alternative the fan shaft can be directly attached to the carrier.

In a further embodiment, the output shaft device comprises a curvic or spline coupling. The coupling could e.g. the form of a bellow shaft to achieve a decoupling of the bending between the output shaft and the gearbox device.

In one embodiment of the gas turbine, the load path for force and/or torque from the driving turbine to the propulsive fan extends from the driving turbine to the propulsive fan via the input shaft device, the gearbox device and the output shaft device. There is no through shaft extending through the gearbox device towards the front.

In one embodiment, the ring gear is rigidly connected to the static front cone structure, as it is the case in epicyclic gearbox devices.

In a further embodiment, a static structure comprises struts for transferring radial loads, in particular with parts of the structure comprising an essential linear structure. Linear in this respect means that the load bearing structure elements and struts are located within an angle of less than 15° measured from a radial inward starting point such as e.g. the fan shaft bearing device. From this starting point radial loads are transferred outwards.

In a further embodiment the fan shaft is torsional stiff.

It is also possible that e.g. the gearbox device comprises an epicyclic gearbox with the ring gear being fixed relative to the other parts of the gearbox device and the output shaft device being connected to the planet carrier.

Alternatively, the gearbox device comprises a planetary gearbox in star arrangement with the planet carrier fixed relative to the other parts of the gearbox device and the output shaft device being connected to the ring gear.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

The gas turbine engine comprises a gearbox device that receives an input from the core shaft and outputs drive to the fan so as to drive the fan at a lower rotational speed than the core shaft. The input to the gearbox device may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox device may be arranged to be driven by the core shaft that is configured to rotate (for example in use) at the lowest rotational speed (for example the first core shaft in the example above). For example, the gearbox device may be arranged to be driven only by the core shaft that is configured to rotate (for example in use) at the lowest rotational speed (for example only be the first core shaft, and not the second core shaft, in the example above). Alternatively, the gearbox device may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18 or 18.5. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 N kg$^{-1}$ s, 105 N kg$^{-1}$ s, 100 N kg$^{-1}$ s, 95 N kg$^{-1}$ s, 90 N kg$^{-1}$ s, 85 N kg$^{-1}$ s or 80 N kg$^{-1}$ s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400 K, 1450 K, 1500 K, 1550 K, 1600 K or 1650 K. The TET at cruise may be in an inclusive range bounded by any two of the values in the previous sentence (i.e. the values may form upper or lower bounds). The maximum TET in use of the engine may be, for example, at least (or on the order of) any of the following: 1700 K, 1750 K, 1800 K, 1850 K, 1900 K, 1950 K or 2000 K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example, at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55° C.

As used anywhere herein, "cruise" or "cruise conditions" may mean the aerodynamic design point. Such an aerodynamic design point (or ADP) may correspond to the conditions (comprising, for example, one or more of the Mach number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 1:
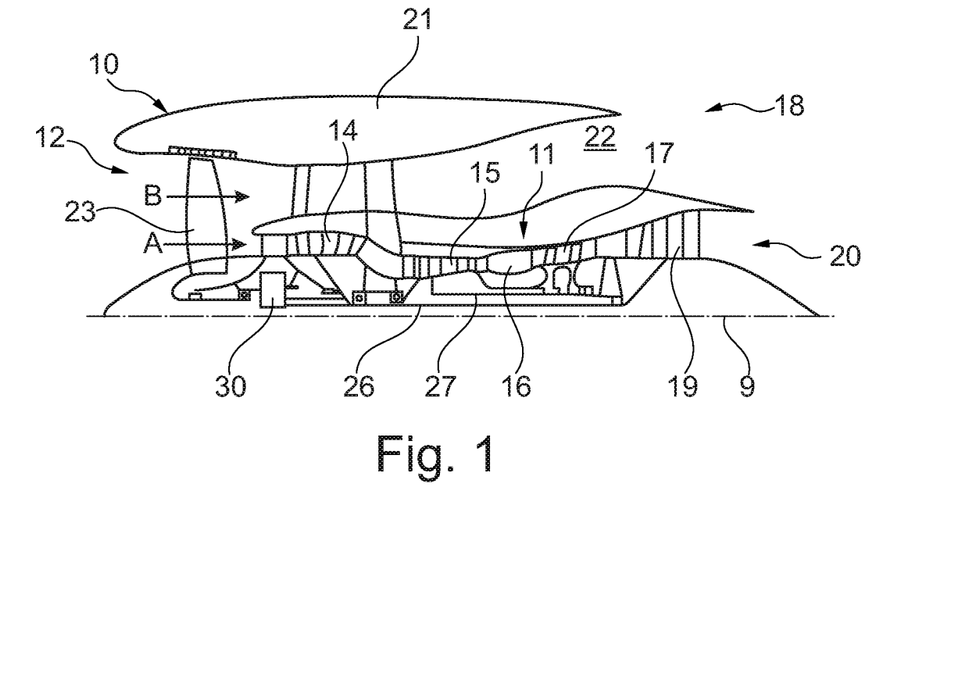
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low-pressure compressor 14, a high-pressure compressor 15, combustion equipment 16, a high-pressure turbine 17, a low-pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low-pressure compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high-pressure and low-pressure turbines 17, 19 before being exhausted through the nozzle 20 to provide some propulsive thrust. The high-pressure turbine 17 drives the high-pressure compressor 15 by a suitable interconnecting shaft 27. The fan 23 generally provides the majority of the propulsive thrust. The epicyclic gearbox 30 is a reduction gearbox.

Figure 2:
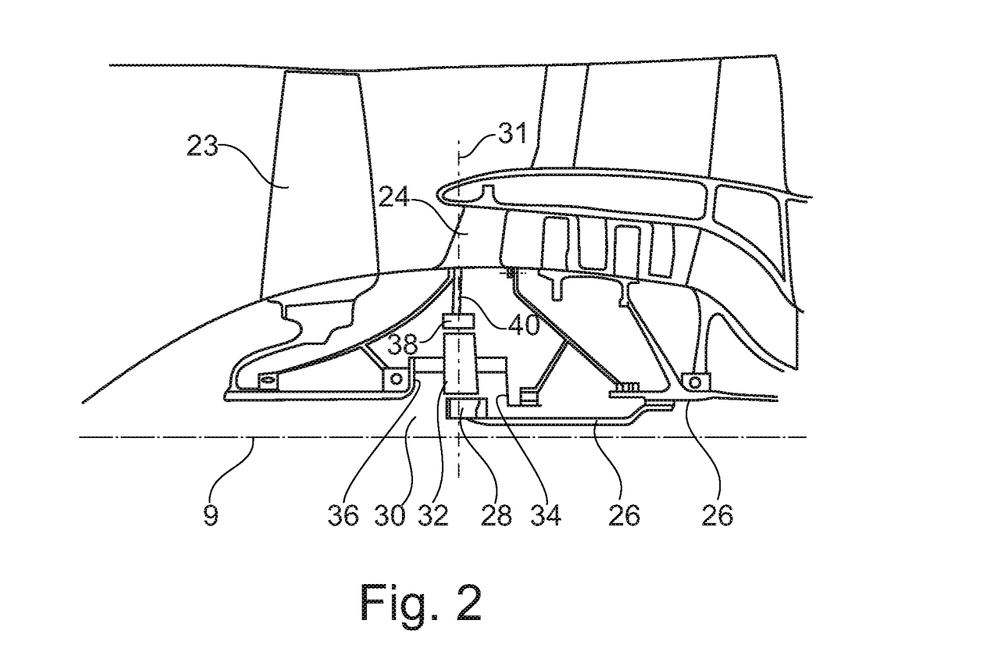
FIG. 2 is a close up sectional side view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
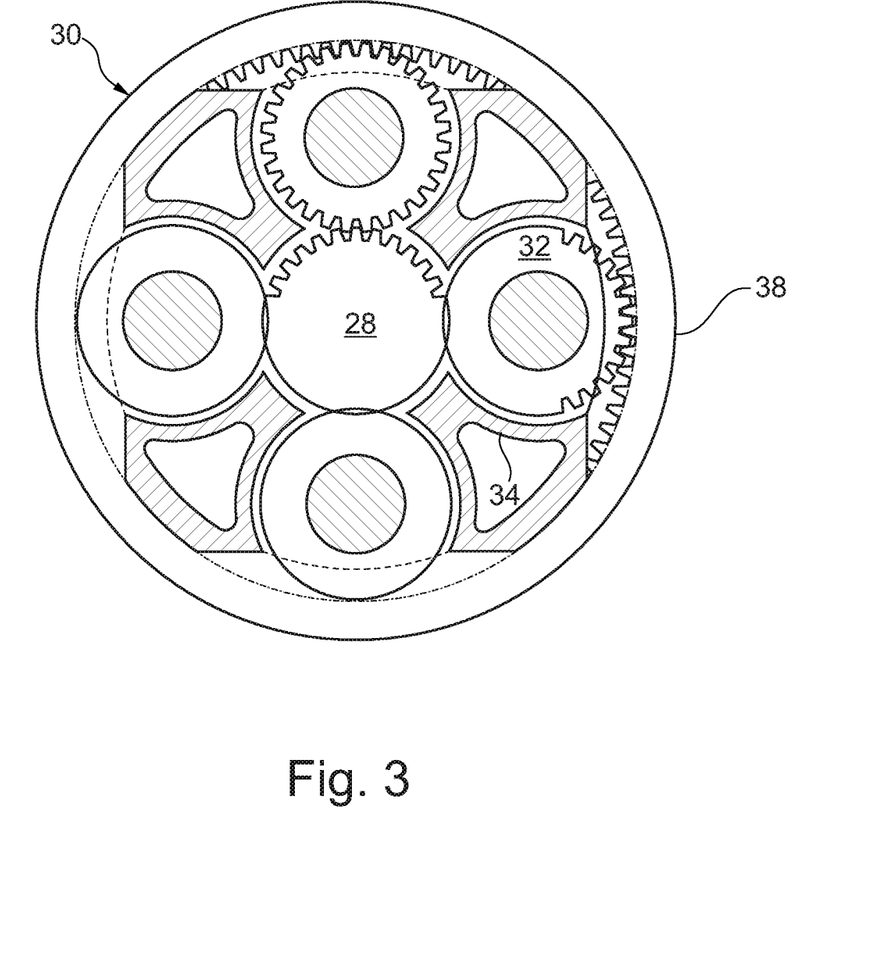
FIG. 3 is a partially cut-away view of a gearbox for a gas turbine engine.

The epicyclic gearbox device 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox device 30 generally comprise at least three planet gears 32.

The epicyclic gearbox device 30 illustrated by way of example in FIGS. 2 and 3 is of the planetary type, in that the planet carrier 34 is coupled to an output shaft via linkages 36, with the ring gear 38 fixed. In another embodiment the carrier and the output shaft can be manufactured as one part. However, any other suitable type of epicyclic gearbox device 30 may be used. By way of further example, the epicyclic gearbox device 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox device 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox device 30 in the engine 10 and/or for connecting the gearbox device 30 to the engine 10. By way of further example, the connections (such as the linkages 36, 40 in the FIG. 2 example) between the gearbox device 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox device 30 and the fixed structures, such as the gearbox casing) may be used, and the disclosure is not limited to the exemplary arrangement of FIG. 2. For example, where the gearbox device 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox device may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
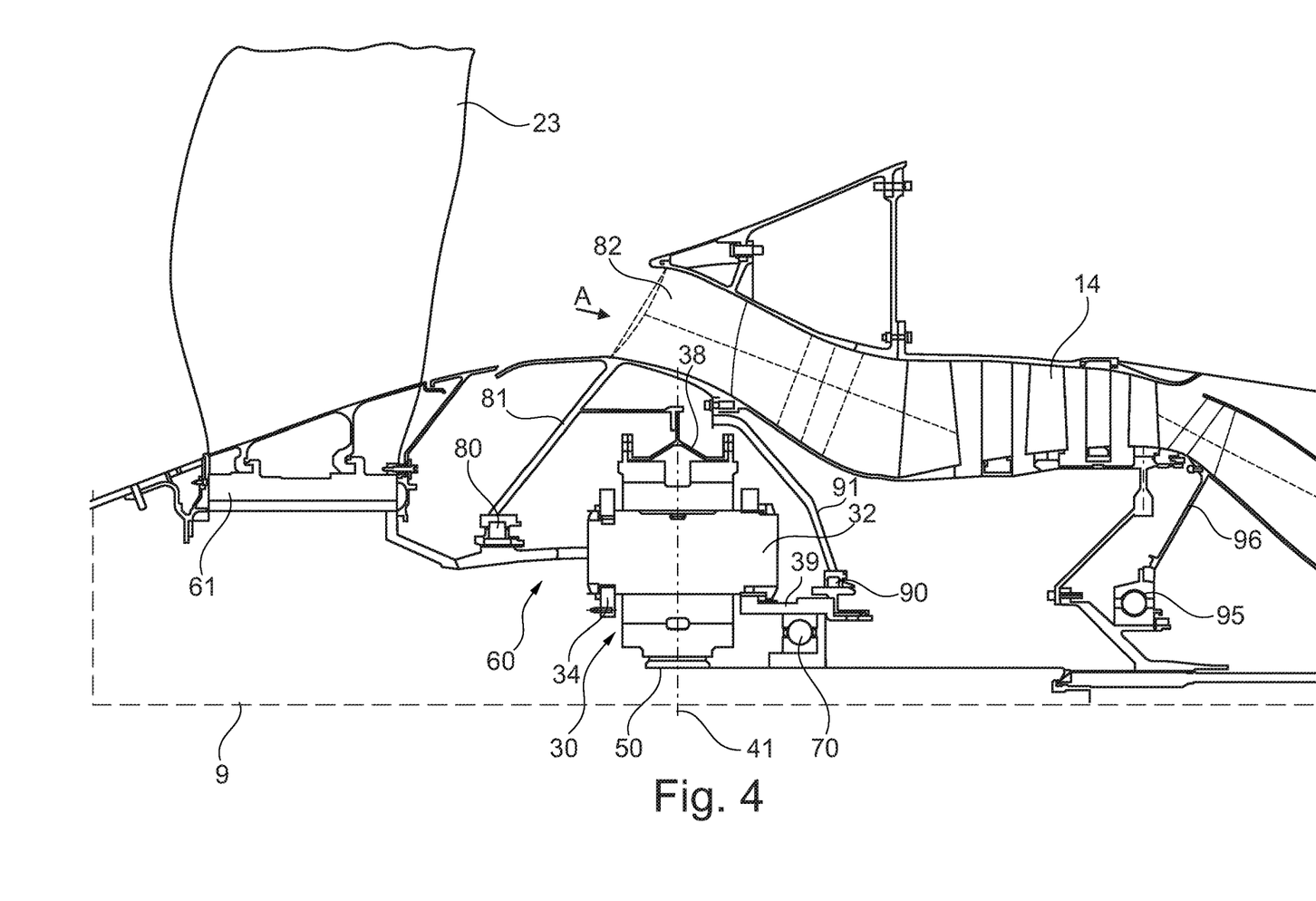
FIG. 4 shows schematically the upper half of a front section of an embodiment of a gas turbine with a drive train with a stiff input shaft device of an epicyclic gearbox device, a gearbox device and an output shaft device extending to a propulsive fan including a first embodiment of a structural support.

In FIG. 4 a schematic view of the front section of geared turbofan engine 10 is shown. The view axially extends from the propulsive fan 23 in the front to the low-pressure compressor 14 towards the rear.

The drive train comprises an input shaft device 50 (e.g. comprising the shaft 26 shown in FIG. 1), here driven by the not shown low-pressure turbine 19. The input shaft device 50 is connected to the sun gear 28 of the epicyclical gearbox device 30. The input shaft device 50 is essentially a hollow tube device providing good torsional stiffness properties.

The output of the gearbox device 30 takes place via the planet carrier 34 which is connected with an output shaft device 60 which has a portion acting as a fan shaft 61. That portion is rigidly connected with the propulsive fan 23. In an alternative embodiment, the output shaft 60 can be replaced by a direct connection of the fan disk 61 to the carrier 34.

Therefore, the input torque is transmitted from the input shaft device 50 to the sun gear 28 of the gearbox device 30, and to some extent to the ring gear mount. The planet carrier 34 transmits the output torque (at a reduced rotational speed) to the output gear device 60 and eventually to the propulsive fan 23.

It is possible that the shape of the shaft devices 50, 60 can be more complex and comprises more than one piece.

The shafting arrangement of the embodiment shown in FIG. 4 also comprises four bearing systems e.g. for taking the mechanical loads or for locating the propulsive fan 23 and the gearbox device 30.

The first bearing to be described is an inter-shaft bearing system 70 being positioned radially between the planet carrier 34 and the input shaft device 50.

This inter-shaft bearing system 70 comprises one roller bearing. In alternative embodiments, more than one roller bearing (e.g. double bearings, two bearings of different design) or other bearing designs can be used. It is also possible that different bearings of the inter-shaft bearing system 70 are positioned at different locations.

The inter-shaft bearing system 70 is, in this embodiment, axially adjacent to the gearbox device 30 on the input side. The axial distance between the inter-shaft carrier bearing device 70 to the gearbox device 30 can e.g. be between 0.001 and 2 times the inner radius of the inner radius of a seat element 39 for the inter-shaft bearing system. This could be in the range of 1 to 100 mm measured from the axial front side of the inter-shaft bearing device 70 to a centreline 41 of the gearbox device 30.

The radial inner seat of the inter-shaft bearing system 70 is on seat element 39 extending axially to the rear of the gearbox device 30.

A rear carrier bearing device 90 is positioned on the input side of the gearbox device 30.

The fan axial load is transferred via the fan-shaft bearing system 80 (roller bearing), via the gearbox device 30 and into the input-shaft bearing 95 towards the rear. With this arrangement the support structures of the bearings can be reduced.

On the output side of the gearbox device 30, the output shaft device 60 only has one bearing system, a fan shaft bearing system 80. The radial inner seat of that bearing system is on the fan shaft 61, being a part of the output shaft device 60. The radial outer seat of the fan shaft bearing system 80 is connected to a static front cone structure 81. In the embodiment shown a roller bearing is used in the fan shaft bearing system 80. In alternative embodiments, more than one roller bearing (e.g. double bearings, two bearings of different design) or other bearing designs can be used. It would be possible to install a ball bearing and transfer the axial load to the fan 13 via the static front cone structure 81.

In the embodiment described herein the fan shaft bearing system 80 can have an outer diameter between 0.05 to 0.2 times the diameter of the propulsive fan 13. This range can be between 175 and 1250 mm.

In an alternative embodiment, the fan shaft bearing system 80 is directly located underneath the propulsive fan 23.

The output shaft device 60 in the embodiment shown in FIG. 4 comprises essentially a cylindrical section adjacent to the output side of the gearbox device 30 and under the propulsive fan 23 (i.e. the fan shaft section 61). In-between there is a conical section 62 linking the two cylindrical sections. Conical in this context means that the axial cross-section in this part of the output shaft device 60 is a straight line inclined radially inwards. In other embodiments this linking section can have different shapes than the conic shape in FIG. 4.

In the embodiment shown in FIG. 4 the static front cone structure 81 and the static structure 91 form together one cavity around the gearbox device 30.

The ring gear 38 is rigidly connected to the static front cone structure 81 but alternatively, it can be connected to a different static part within the engine 10.

The load path for force and/or torque from the driving turbine 19, i.e. the low-pressure turbine 19 to the propulsive fan 23 extends via the input shaft device 50, the through shaft 63, the gearbox device 30 and the output shaft device 60. There is no through shaft.

Figure 5:
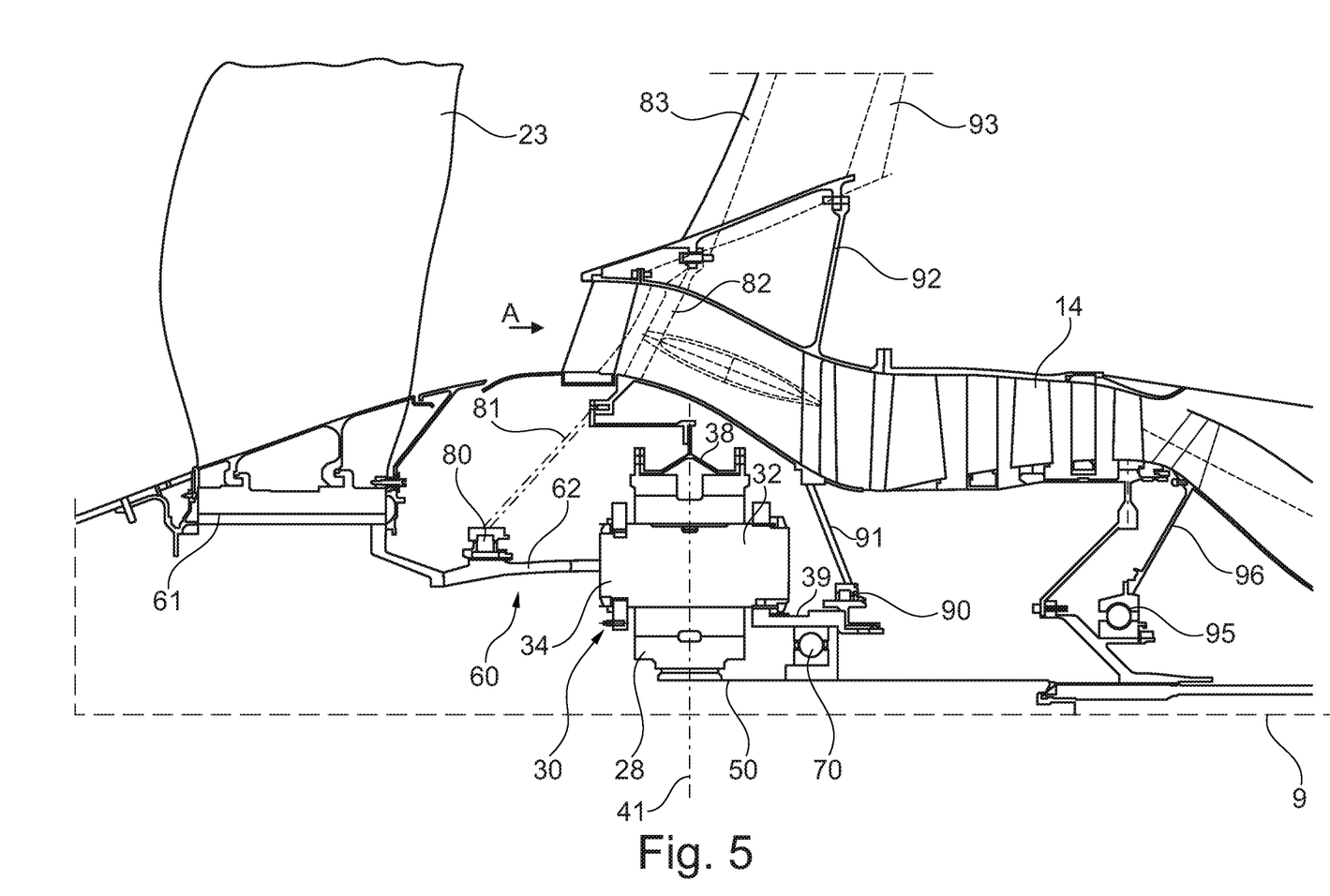
FIG. 5 shows schematically the upper half of a front section of an embodiment of a gas turbine with a drive train with a stiff input shaft device of an epicyclic gearbox device, a gearbox device and an output shaft device extending to a propulsive fan including a second embodiment of a structural support.

In FIG. 5 a variation of the embodiment shown in FIG. 4 is described. Reference can be made to the respective description above.

The embodiment shown in FIG. 5 comprises furthermore a structure comprising a plurality of struts 82, 83, 84, 85 for taking loads from the moving parts relatively close to the rotational axis 9 towards the radially outer parts of the gas turbine engine 10.

In the front the static front cone structure 81 transmits radial loads via a first strut 82 spanning the airflow A into the engine core 11 and the second strut 83. The section of the front cone structure 81 and the struts 82, 83 are aligned in a relatively straight, linear arrangement, i.e. the section of the front cone structure 81, and the struts 82, 83 are positioned within an angular field of is less than 15° measured from the base of the front cone structure 81, i.e. the fan shaft bearing system 81. With this linear arrangement, loads can effectively be transferred.

A similar structure is located axially further to the rear. Here, the static structure 91, and struts 92, 93 are aligned in an essentially vertical arrangement.

The two structures 81, 82, 83, 91, 92, 93 described above transfer loads essentially in a radial direction. The channel for the core airflow A provides some stabilization in an essential axial direction resulting in a meshlike structure. This mesh-like structure is torsionaly stiff.

In the embodiments shown in FIGS. 4 and 5 the input shaft 50 is shown schematically as a straight shaft, i.e. essentially a hollow tube. It is possible that in an alternative embodiment the input shaft comprises flexibility means such as grooves or meandering sections to provide a defined flexibility in the shaft.

Figure 6:
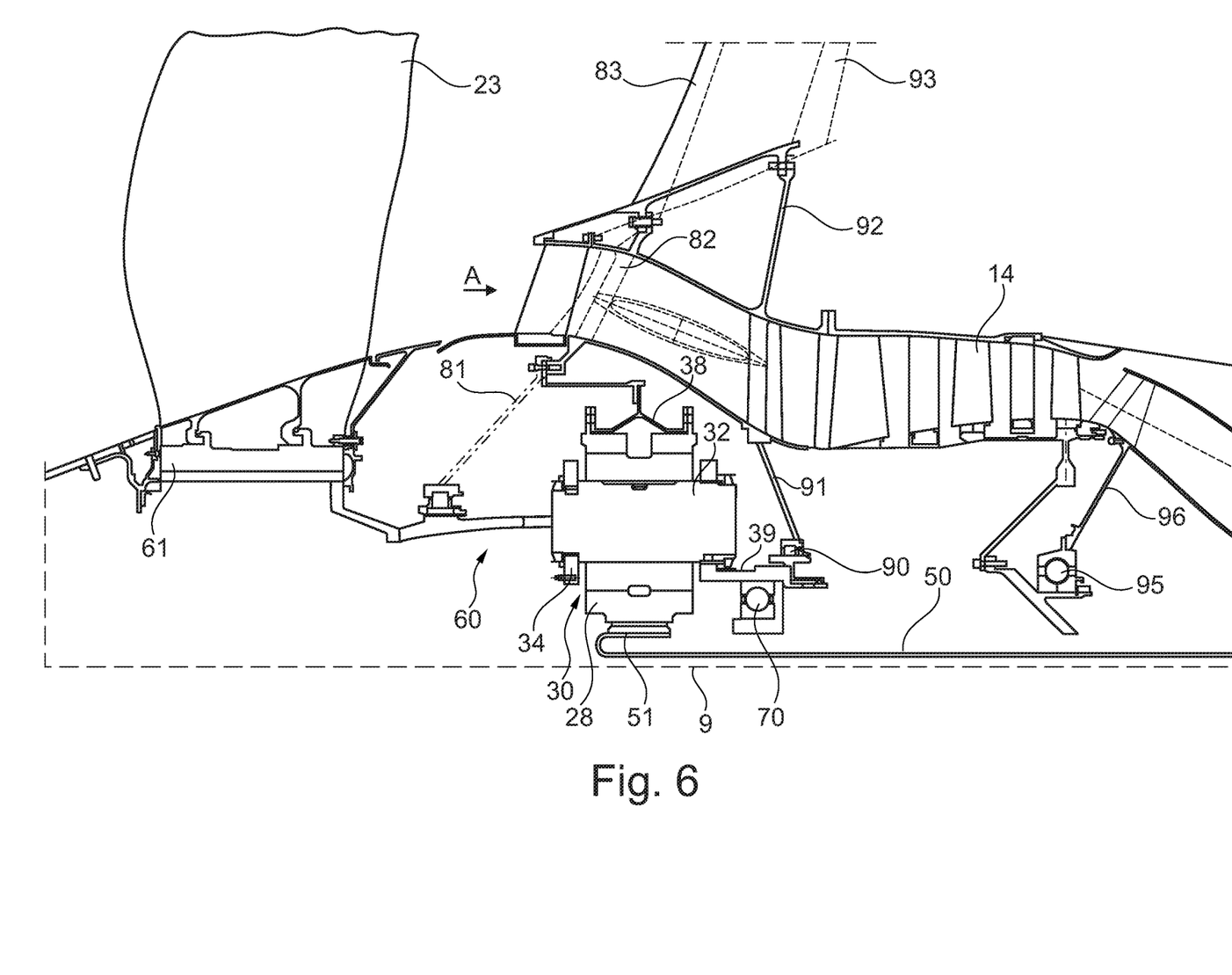
FIG. 6 shows a variation of the embodiment shown in FIG. 4 with a torsional flexible input shaft device.

This is shown in FIG. 6, the embodiment being a variation of the one shown in FIG. 5. The input shaft device 50 comprises a diaphragm section 51, i.e. a folded section of the input shaft device.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine, comprising:
    a turbine connected via an input shaft device to a gearbox device having a sun gear;
    a planet carrier having a plurality of planet gears attached thereto; and
    a ring gear,
    wherein the sun gear is connected to the input shaft device,
    the planet carrier or the ring gear is connected to a propulsive fan via an output shaft device of the gearbox device, with a rear carrier bearing device radially between the planet carrier and a support structure on an input side of the gearbox device, and
    an inter-shaft bearing system being positioned radially between the input shaft device and the planet carrier of the gearbox device.

2. The gas turbine of claim 1, wherein the input shaft device has at least one of (i) a radial stiffness that is at least 20% of a stiffness of the support structure, and (ii) an axial stiffness greater than or equal to 100% of an axial stiffness of the support structure.

3. The gas turbine of claim 1, wherein the inter-shaft bearing system is located axially within or in front of a low-pressure compressor or an intermediate compressor.

4. The gas turbine of claim 1, wherein at least one of (i) the rear carrier bearing device comprises at least one roller bearing and (ii) the inter-shaft bearing system comprises at least one ball bearing.

5. The gas turbine of claim 1, wherein the inter-shaft bearing system or the rear carrier bearing device is axially adjacent to the gearbox device on the input side.

6. The gas turbine of claim 1, wherein a fan shaft bearing system is radially located between a shaft of the propulsive fan as part of the output shaft device and the support structure.

7. The gas turbine of claim 6, wherein the fan shaft bearing system has an outer diameter between 0.05 to 0.20 times a diameter of the propulsive fan.

8. The gas turbine of claim 1, the planet carrier comprises a seat element extending axially to a rear of the gearbox device providing a radial seat for the inter-shaft bearing system.

9. The gas turbine of claim 1, wherein an input shaft bearing system is radially located between the input shaft device and the support structure.

10. The gas turbine of claim 1, wherein the output shaft device comprises at least one axial cross-section with a conical, sigmoidal, or logarithmical shape.

11. The gas turbine of claim 1, wherein the output shaft device comprises a curvic or a spline coupling.

12. The gas turbine of claim 1, wherein at least one of a load path for force and torque from the turbine to the propulsive fan extends via the input shaft device, the gearbox device, and the output shaft device.

13. The gas turbine of claim 1, wherein the support structure of the gearbox device comprises a static front cone structure, a strut for transferring a radial load, and a static structure.

14. The gas turbine of claim 1, wherein a shaft of the propulsive fan is torsionally stiff.

15. The gas turbine of claim 1, wherein the gearbox device comprises an epicyclic gearbox with the ring gear being fixed relative to other parts of the gearbox device and the output shaft device being connected to the planet carrier.

16. The gas turbine of claim 1, wherein the gearbox device comprises a planetary gearbox in star arrangement with the planet carrier fixed relative to other parts of the gearbox device and the output shaft device being connected to the ring gear.

17. The gas turbine of claim 1, wherein the input shaft device has a high rigidity.

18. The gas turbine of claim 1, wherein the input shaft device has a means for decreasing the rigidity.

19. The gas turbine of claim 13, wherein the ring gear is rigidly connected to the static front cone structure.

20. A gas turbine engine, comprising:
a turbine connected via an input shaft device to a gearbox device having a sun gear;
a planet carrier having a plurality of planet gears attached thereto; and
a ring gear,
wherein the sun gear is connected to the input shaft device,
the planet carrier or the ring gear is connected to a propulsive fan via an output shaft device of the gearbox device, with a rear carrier bearing device radially between the planet carrier and a support structure on an input side of the gearbox device,
an inter-shaft bearing system being positioned radially between the input shaft device and the planet carrier of the gearbox device, and
the planet carrier comprises a seat element extending axially to a rear of the gearbox device providing a radial seat for the inter-shaft bearing system.

21. The gas turbine of claim 20, wherein the support structure of the gearbox device comprises a static front cone structure, a strut for transferring a radial load, and a static structure.

22. The gas turbine of claim 20, wherein the input shaft device has at least one of (i) a radial stiffness that is at least 20% of a stiffness of the support structure, and (ii) an axial stiffness greater than or equal to 100% of an axial stiffness of the support structure.

23. The gas turbine of claim 20, wherein the inter-shaft bearing system is located axially within or in front of a low-pressure compressor or an intermediate compressor.

24. The gas turbine of claim 20, wherein at least one of (i) the rear carrier bearing device comprises at least one roller bearing and (ii) the inter-shaft bearing system comprises at least one ball bearing.

25. The gas turbine of claim 20, wherein the inter-shaft bearing system or the rear carrier bearing device is axially adjacent to the gearbox device on the input side.

26. The gas turbine of claim 20, wherein a fan shaft bearing system is radially located between a shaft of the propulsive fan as part of the output shaft device and the support structure.

27. The gas turbine of claim 26, wherein the fan shaft bearing system has an outer diameter between 0.05 to 0.20 times a diameter of the propulsive fan.

28. The gas turbine of claim 20, wherein an input shaft bearing system is radially located between the input shaft device and the support structure.

29. The gas turbine of claim 20, wherein the output shaft device comprises at least one axial cross-section with a conical, sigmoidal, or logarithmical shape.

30. The gas turbine of claim 20, wherein the output shaft device comprises a curvic or a spline coupling.

31. The gas turbine of claim 20, wherein at least one of a load path for force and torque from the turbine to the propulsive fan extends via the input shaft device, the gearbox device, and the output shaft device.

32. The gas turbine of claim 21, wherein the ring gear is rigidly connected to the static front cone structure.

33. The gas turbine of claim 20, wherein a shaft of the propulsive fan is torsionally stiff.

34. The gas turbine of claim 20, wherein the gearbox device comprises an epicyclic gearbox with the ring gear being fixed relative to other parts of the gearbox device and the output shaft device being connected to the planet carrier.

35. The gas turbine of claim 20, wherein the gearbox device comprises a planetary gearbox in star arrangement with the planet carrier fixed relative to other parts of the gearbox device and the output shaft device being connected to the ring gear.

36. The gas turbine of claim 20, wherein the input shaft device has a high rigidity.

37. The gas turbine of claim 20, wherein the input shaft device has a means for decreasing the rigidity.

* * * * *